(12) United States Patent
Beier

(10) Patent No.: US 9,032,702 B2
(45) Date of Patent: May 19, 2015

(54) ACCESSORY GEARBOX DEVICE FOR A JET ENGINE

(75) Inventor: Juergen Beier, Schulzendorf (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 184 days.

(21) Appl. No.: 13/593,096

(22) Filed: Aug. 23, 2012

(65) Prior Publication Data

US 2014/0026700 A1 Jan. 30, 2014

(30) Foreign Application Priority Data

Sep. 2, 2011 (DE) .......................... 10 2011 112 250

(51) Int. Cl.
*F02C 7/32* (2006.01)

(52) U.S. Cl.
CPC ............. *F02C 7/32* (2013.01); *Y10T 74/19614* (2015.01); *Y10T 74/19* (2015.01); *Y02T 50/671* (2013.01)

(58) Field of Classification Search
CPC ........................................................ F02C 7/32
USPC ............................................................ 290/52
See application file for complete search history.

(56) References Cited

U.S. PATENT DOCUMENTS

| | | | | |
|---|---|---|---|---|
| 2,402,547 A * | 6/1946 | Gilfillan | ....................... | 290/36 R |
| 2,716,709 A * | 8/1955 | Rowe | ............................. | 310/428 |
| 4,525,995 A * | 7/1985 | Clark | ........................... | 60/39.08 |
| 4,733,155 A * | 3/1988 | Smith | .............................. | 322/10 |
| 5,114,103 A * | 5/1992 | Coffinberry | ................... | 244/209 |
| 5,694,765 A * | 12/1997 | Hield et al. | ................. | 60/39.163 |
| 6,851,267 B2 * | 2/2005 | Bruno et al. | ..................... | 60/787 |
| 6,933,633 B2 | 8/2005 | Kaneko et al. | | |
| 7,484,354 B2 * | 2/2009 | Stretton | ....................... | 60/226.1 |
| 8,063,501 B2 * | 11/2011 | Finney | ............................ | 290/52 |
| 8,225,919 B2 * | 7/2012 | Harris et al. | ................. | 192/69.2 |
| 8,955,403 B2 * | 2/2015 | Beier et al. | .................... | 74/15.63 |
| 2001/0047647 A1 * | 12/2001 | Cornet | ......................... | 60/39.02 |
| 2006/0021323 A1 * | 2/2006 | Beardsley | .................. | 60/39.183 |
| 2007/0137214 A1 * | 6/2007 | Zewde et al. | .................. | 60/782 |
| 2008/0006023 A1 | 1/2008 | Lardellier | | |
| 2008/0053257 A1 * | 3/2008 | Dusserre-Telmon et al. | ..... | 74/11 |
| 2008/0173114 A1 | 7/2008 | Charier et al. | | |
| 2010/0156113 A1 | 6/2010 | Lemmers | | |
| 2010/0327589 A1 | 12/2010 | Macchia | | |
| 2012/0117982 A1 * | 5/2012 | Suciu et al. | ..................... | 60/802 |
| 2012/0159964 A1 * | 6/2012 | Huang et al. | .................... | 60/786 |
| 2013/0098179 A1 * | 4/2013 | Beier et al. | .................... | 74/15.63 |
| 2013/0319140 A1 * | 12/2013 | Brault et al. | ................. | 74/15.86 |

FOREIGN PATENT DOCUMENTS

| | | | |
|---|---|---|---|
| DE | 102008061275 | | 9/2009 |
| EP | 1908941 | A2 * | 4/2008 |
| EP | 1939429 | A2 * | 7/2008 |
| EP | 2239440 | A1 * | 10/2010 |

(Continued)

*Primary Examiner* — Joseph Waks
(74) *Attorney, Agent, or Firm* — Timothy J. Kilma; Shuttleworth & Ingersoll, PLC

(57) ABSTRACT

An accessory gearbox for an engine having at least one accessory gearbox shaft connectable to an auxiliary unit and driveable by a drive shaft, the drive shaft being operatively connectable to an engine shaft of the engine. At least one auxiliary unit can be arranged on the drive shaft and/or in the area of the operative connection between the drive shaft and the engine shaft and/or on an accessory gearbox shaft connectable to a further auxiliary unit.

15 Claims, 3 Drawing Sheets

(56) References Cited

FOREIGN PATENT DOCUMENTS

Figure 1:
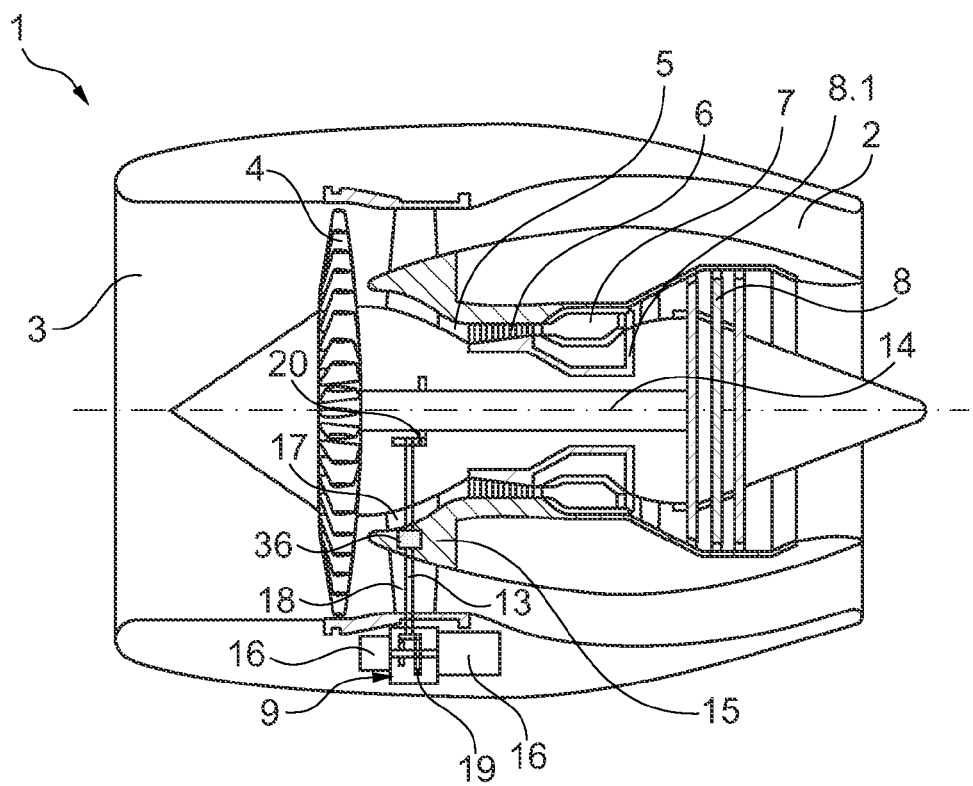

| | | | | |
|---|---|---|---|---|
| GB | 190306098 A | * | 0/1903 | |
| GB | 652351 A | * | 5/1945 | |
| JP | 09200988 A | * | 7/1997 | |
| WO | 2008/021401 | | 2/2008 | |

* cited by examiner

ACCESSORY GEARBOX DEVICE FOR A JET ENGINE

This application claims priority to German Patent Application DE102011112250.1 filed Sep. 2, 2011, the entirety of which is incorporated by reference herein.

This invention relates to an accessory gearbox for an engine.

Accessory gearboxes for engines having several accessory gearbox shafts each connectable to an auxiliary unit, for example to a fuel pump, a generator or the like, are well known from practice. The accessory gearbox shafts are arranged substantially parallel to the axis of one another and are adapted to the available installation space inside the engine. They are here positioned substantially adjacent to one another and spread in the circumferential direction of the engine, and they are driven via spur gear stages by an accessory gearbox drive shaft operatively connected to the engine shaft.

As independent power source for supplying power to an engine control system, generators of this type, for example so-called permanent magnet alternators (PMAs) are driven via accessory gearboxes. The generators are connectable to an accessory gearbox shaft running parallel to the drive shaft and arrangeable thereon, and can be driven by said accessory gearbox shaft during operation of the engine at a speed in the high-speed range of approximately 10,000 to 24,000 rpm. Furthermore, not only PMAs but also generators with larger dimensions than PMAs are driveable by the accessory gearboxes, these being designed for supplying power to the entire aircraft.

The generators are each arranged on a separate accessory gearbox shaft of the accessory gearbox and are connectable, for example using bolt connections, to a casing of the accessory gearboxes.

The known accessory gearboxes disadvantageously require a large installation space and are distinguished by a high overall weight.

The object underlying the present invention is to provide an accessory gearbox favourable in terms of installation space and having a low overall weight for an engine.

It is a particular object of the present invention to provide solution to the above problems by an accessory gearbox in accordance with the features described herein.

In an accessory gearbox designed in accordance with the invention for an engine having at least one accessory gearbox shaft connectable to an auxiliary unit and driveable by a drive shaft, said drive shaft can be put into an operative connection to an engine shaft of the engine. In accordance with the invention, it is provided that at least one auxiliary unit can be arranged on the drive shaft and/or in the area of the operative connection between the drive shaft and the engine shaft and/or on an accessory gearbox shaft connectable to a further auxiliary unit.

The accessory gearbox in accordance with the invention has the advantage that for arrangement of the at least one auxiliary unit no separate accessory gearbox shaft has to be provided, and instead the at least one auxiliary unit can be arranged on an already provided shaft of the accessory gearbox. This saves on installation space and weight, since the accessory gearbox shaft provided in known accessory gearboxes for the at least one auxiliary unit can be dispensed with. The solution in accordance with the invention can thus be implemented at low cost. Due to the omission of the separate accessory gearbox shaft for the at least one auxiliary unit, a length of the accessory gearbox in the circumferential direction of the engine is also reduced, as a result of which the complexity of oil and air lines for supplying the auxiliary units of the now shortened accessory gearbox is also reduced.

In the accessory gearbox in accordance with the invention, an auxiliary unit can be arranged on one of the described shafts. It is also possible to provide several auxiliary units arranged either jointly on one of the described shafts or arranged on different described shafts.

In an advantageous development of the accessory gearbox in accordance with the invention, the at least one auxiliary unit is preferably designed as a generator and can be arranged at least partially in detachable manner on the drive shaft, in the area of the operative connection between the drive shaft and the engine shaft or the accessory gearbox shaft, such that the parts of the auxiliary unit can be replaced or maintained in a short time in the event of damage.

To permit easy and rapid exchangeability at least of the more maintenance-intensive components of the auxiliary unit, at least one stator and one casing of the auxiliary unit preferably designed as a generator can be arranged in detachable manner on the drive shaft, in the area of the operative connection between the drive shaft and the engine shaft or the accessory gearbox shaft, and a rotor can be firmly connected to a shaft. The rotor, which unlike the stator of the generator is not very prone to faults, can remain connected to the shaft in the event of a replacement of the stator and of the casing of the generator.

In an advantageous embodiment of the accessory gearbox, the rotor is non-rotatably connectable to the shaft by a fixing device designed in particular as a tongue and groove connection.

In a simply designed embodiment of the invention, generator components detachable from a shaft are, in the circumferential direction, designed in at least two parts or two shells. In addition, it is also possible that the rotor is likewise designed in comparable manner to the stator and the casing in two parts, and is detachable from the shaft together with the stator and the casing.

The detachable components of the generator are, in a simply designed embodiment of the invention, on the one hand swivellably coupled to one another by a hinged connection and on the other hand connectable to one another by a locking device for fixing on a shaft of the accessory gearbox and fixable like a sleeve on the shaft. A replacement of the parts of the generator by means of such a hinged/locking connection is possible in a particularly simple manner.

Alternatively or additionally to this, the detachable components of the generator in particular can be arranged on the shaft by means of at least one fastening device gripping around the casing of the generator on the circumferential side. The fastening device can in particular represent a quick-action lock and for example be designed as a so-called V-band clip. The replaceable parts of the generator can as a result be completely separated from one another.

To fix the generator securely on the shaft, the fastening device can be designed for interacting with an axially lateral area of the generator casing and with an area of an adjacent casing adjoining this area of the casing, so that the generator in particular is also secured in the axial direction relative to the adjacent casing in the installed state.

The generator can be designed for arrangement in the area of an end section of the shaft, where the end section of the shaft is completely enclosed by the casing of the generator. In an alternative embodiment of the invention, the generator is designed for arrangement on a continuous shaft of the accessory gearbox of the engine in the area of the generator, where a casing of the generator interacts in particular with casings of adjacent components.

In order to remove thermal energy from the generator during its operation, in particular the energy building up in the area of the stator, the shaft on which the generator can be arranged is, in an advantageous embodiment of the accessory gearbox in accordance with the invention, designed as a hollow shaft and a cooling device is provided with a coolant which can be passed through the shaft for cooling of the generator.

Removal of very large heat quantities building up in the area of the generator, for example in large generators provided for supplying power to an entire aircraft, can be achieved in an advantageous embodiment of the invention by a generator having a separate cooling system which has in particular cooling lines running in the area of the stator.

In a particularly advantageous embodiment of the accessory gearbox in accordance with the invention, a generator stator area having at least one stator is separated from a generator rotor area having at least one rotor. This allows in a simple manner further improved and particularly effective cooling of the generator to be assured, since the cooling medium can come close to the stator in the area of which a major part of the heat is generated in an operating state of the generator.

A complete sealing of the stator area, representing a dry area, from the rotor area, representing a wet area, can be achieved with simple means, whereas in generators with a cooling device in the area of a hollow shaft minor quantities of oil can enter a stator area through the oil separators provided for separation of the dry area. The separation in accordance with the invention of the rotor area from the stator area, or the encapsulation of the stator area, advantageously ensures that the cooling medium does not come into contact with electric components of the stator area. Since the rotor is washed by the cooling medium in the operating state of the generator, it can additionally be corrosion-protected by the cooling medium when an appropriate cooling medium is selected. Cooling of the generator can be achieved here by a cooling device assigned to the generator. The cooling device can also be connected to a further cooling system of the accessory gearbox or of the entire engine, so that the cooling device of the generator does not, for example, have to have a separate tank and/or a separate pump.

In a simply designed development of the invention, a separator element extending between the stator and the rotor is provided for separation of the stator area from the rotor area. Since the separator element is no structural component and accordingly does not have to perform any bearing functions, it can be designed very thin. A distance between the stator and the rotor, which plays a crucial role for the effectivity of the generator, can accordingly be kept very low. Possible losses caused by the slightly increased distance between the rotor and the stator of the generator due to the separator element can if necessary be compensated for in simple manner by a minor increase in a magnetic field strength in comparison to a conventional generator without separator element.

To minimize any effect of the separator element on the effectiveness of the generator, the separator element is, in an advantageous embodiment of the invention, made from a non-magnetic material.

The separator element is, in a simply designed embodiment of the invention, designed as a separate component which can be connected via fastening elements to a casing, in particular to a stator casing of the generator. A material of the separator element can in this embodiment be advantageously selected regardless of a material of the casing. The separator element can for example be fixed to the casing using pins, bolts or similar. In an alternative embodiment of the invention, the separator element is designed integral with a casing of the generator.

The generator can for example be designed for power supply to an engine control system or for power supply to an entire aircraft by dimensioning it commensurately with the respective application.

Besides its design as a generator, the at least one auxiliary unit can for example be designed as a fuel pump, hydraulic pump, bleed unit, pneumatic starter or the like.

Both the features stated in the patent Claims and the features stated in the following exemplary embodiments of the accessory gearbox in accordance with the invention are each suitable, singly or in any combination with one another, to develop the subject matter of the invention. The respective feature combinations do not represent any restriction with regard to the development of the subject matter in accordance with the invention, but have substantially only exemplary character.

Figure 4:
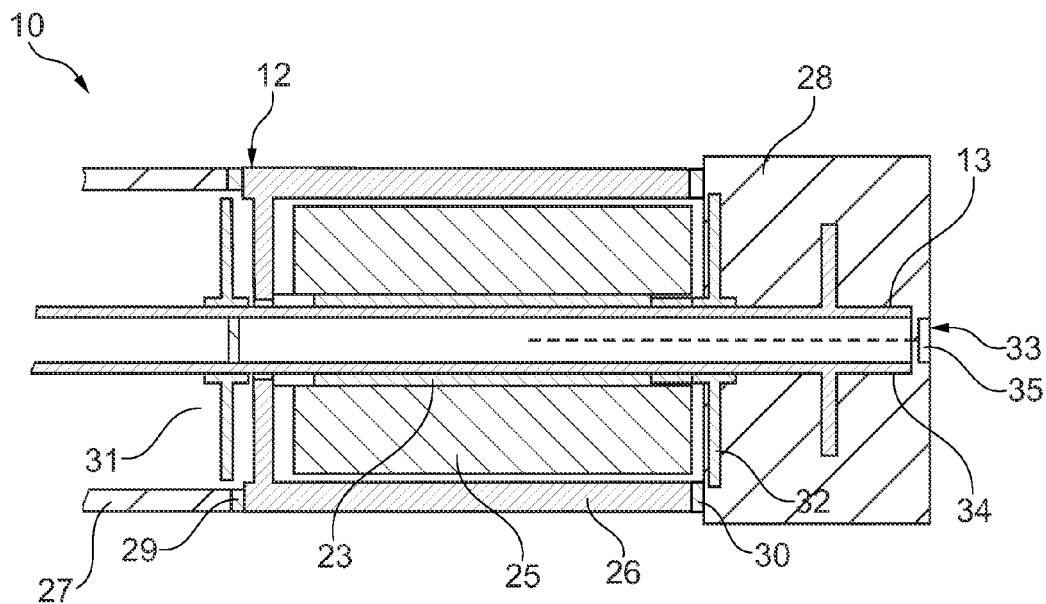
Figure 5:
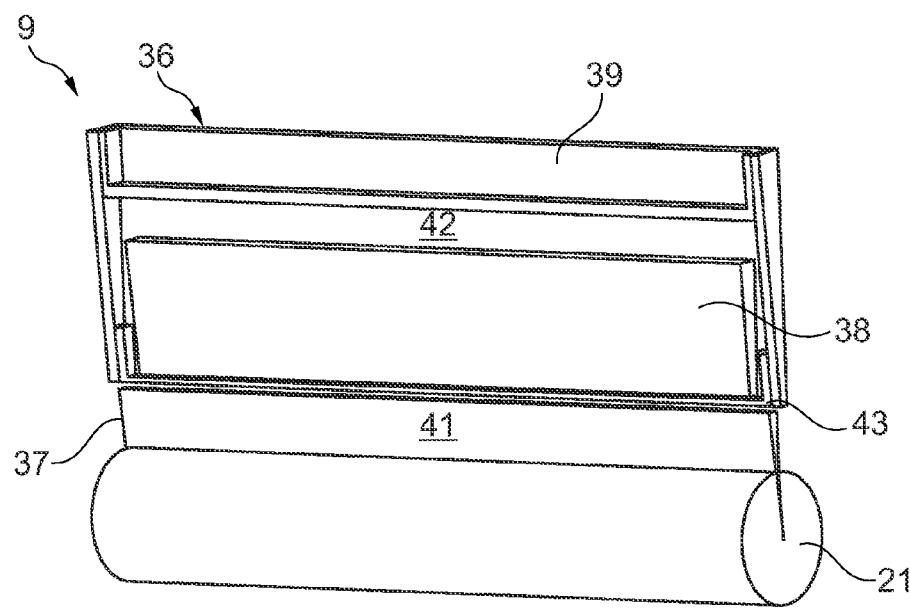
Figure 6:
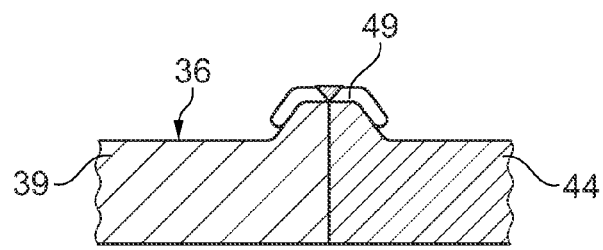
Figure 7:
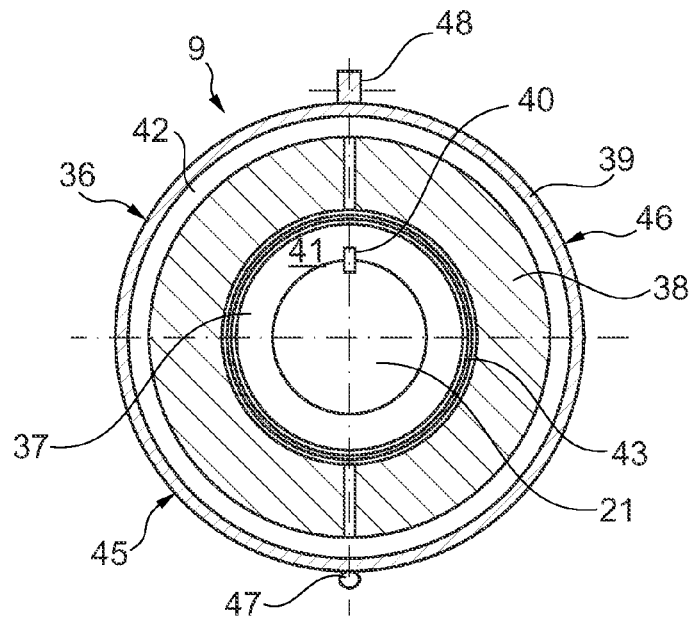

Further advantages and advantageous embodiments of the accessory gearbox in accordance with the invention become apparent from the patent Claims and the exemplary embodiments described in principle in the following with reference to the accompanying drawing. In the drawing, FIG. 1 shows a highly schematized longitudinal sectional view of a jet engine featuring an accessory gearbox arranged substantially in the radial direction outside a bypass duct of the jet engine, the accessory gearbox being provided with a generator arranged in the area of an intermediate casing of the jet engine, FIG. 2 shows a highly schematized longitudinal sectional view of the jet engine as per FIG. 1 with an accessory gearbox substantially arranged in the area of the intermediate casing of the jet engine, with a generator being provided in the area of a drive shaft of the accessory gearbox, FIG. 3 shows a representation of a jet engine corresponding to FIG. 2 with an accessory gearbox substantially arranged in the area of the intermediate casing of the jet engine, with a generator being provided at an alternative position of the drive shaft of the accessory gearbox, FIG. 4 shows a simplified representation of the generator as per FIG. 2 arranged on the drive shaft of the accessory gearbox, FIG. 5 shows a simplified representation of a development of the generator as per FIG. 4 with a separator element separating a stator area from a rotor area, FIG. 6 shows a simplified sectional representation of a cutout of the generator as per FIG. 5 with a casing adjacent to a casing of the generator, with a fastening device for fixing the casing of the generator to the adjacent casing being illustrated, and FIG. 7 shows a cross-sectional view through an axially central area of the generator as per FIG. 5, with a split in the generator being shown in the circumferential direction.

Figure 2:
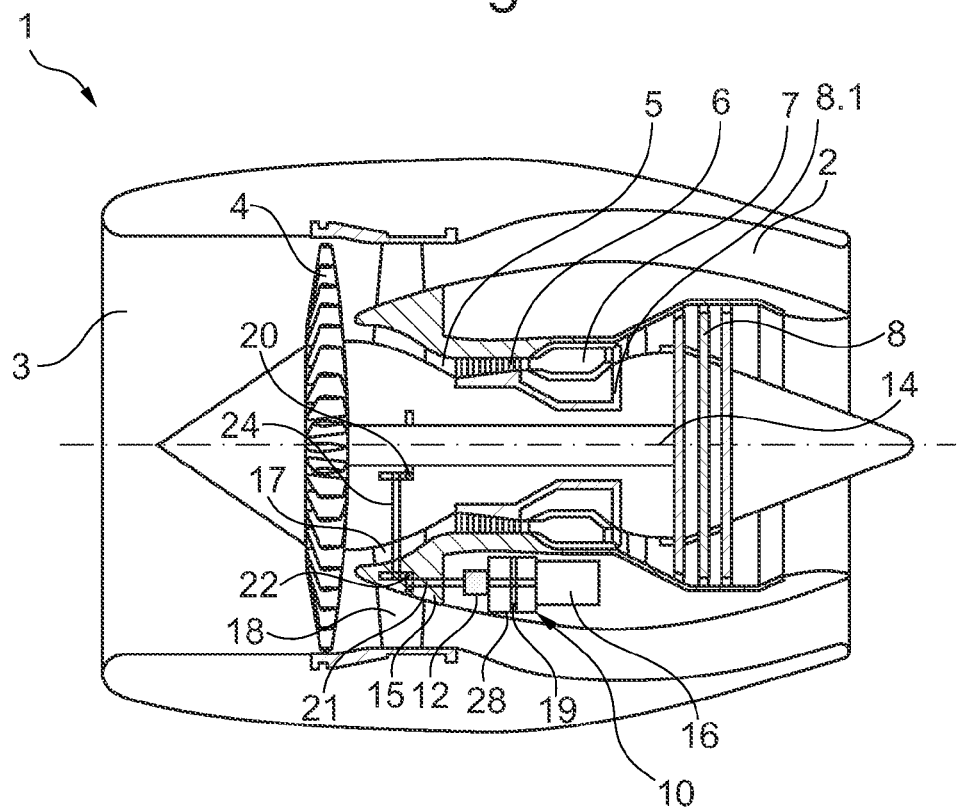
Figure 3:
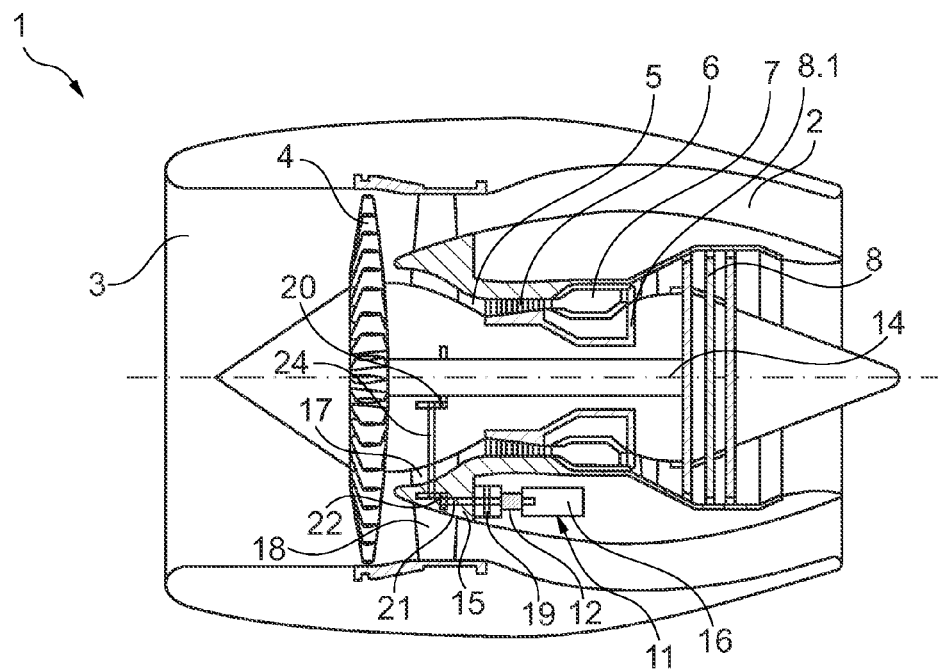

FIGS. 1 to 3 each show a jet engine 1, where the common design of the jet engines 1 is described first and then their differences.

The jet engine 1 is provided with a bypass duct 2 and an intake area 3, where a fan 4 adjoins downstream the intake area 3 in a manner known per se. Again downstream of the fan 4, the fluid flow in the jet engine 1 splits into a bypass flow and a core flow, with the bypass flow flowing through the bypass duct 2 and the core flow into an engine core 5 which is in turn designed in a manner known per se with a compressor device 6, a burner 7, a low-pressure turbine 8 intended for powering the fan 4 and a high-pressure turbine 8.1 intended for powering the compressor device 6.

FIGS. 1 to 3 furthermore each show schematically illustrated accessory gearboxes 9, 10, 11 which differ from one another in their design and their arrangement.

The accessory gearbox 9 shown in FIG. 1 is arranged substantially radially outside the bypass duct 2 and includes a drive shaft 13 via which the accessory gearbox 9 is connected to a central engine shaft 14. Via gear pairings 19, accessory gearbox shafts are driven by the drive shaft 13, on which shafts are arranged various auxiliary units 16 such as a fuel pump, a hydraulic pump, a bleed unit or a pneumatic starter. The drive shaft 13 is in this case designed in the manner of a side gearbox.

For linking the drive shaft 13 of the accessory gearbox 9 to the engine shaft 14, a bevel gearing 20 is provided in this case, via which the drive shaft 13 is linked to a high-pressure shaft of the engine shaft 14 which in the operating state of the jet engine 1 rotates at a higher speed than a low-pressure shaft arranged coaxially thereto and to which the fan 4 is linked.

The drive shaft 13 is designed in one piece and passes through a so-called inner strut 17, i.e. a strut designed with a hollow section, in a substantially radial direction from the engine shaft 14 outwards through the engine core 5 to an intermediate casing 15 arranged in the area between the engine core 5 and the bypass duct 2, and from there substantially in the radial direction through an outer strut 18 passing through the bypass duct 2 further outwards to the accessory gearbox shafts.

In the exemplary embodiment shown in FIG. 2, the accessory gearbox 10 with the accessory gearbox shafts is arranged substantially between the bypass duct 2 and the engine core 5 in the area of the intermediate casing 15.

A drive shaft 21 of the accessory gearbox 10 extending substantially in the axial direction is in operative connection to an auxiliary shaft 24 via a bevel gearing 22. The auxiliary shaft 24 passes through the inner strut 17 substantially in the radial direction and is coupled at its end facing away from the drive shaft 21 to the engine shaft 14, such that the auxiliary shaft 24 provides an operative connection between the engine shaft 14 and the drive shaft 21.

The exemplary embodiment shown in FIG. 3 corresponds substantially to the embodiment shown in FIG. 2 and differs from the latter only in the arrangement of a generator 12 representing an auxiliary unit.

Each accessory gearbox 9, 10, 11 has a generator 12 and 36 respectively, which in principle can be arranged on every shaft of the accessory gearbox 9, 10, 11. The embodiments shown in FIGS. 1 to 3 are only described as examples for a large number of further possibilities for arranging the generators 12 and 36, respectively.

In all the designs of the accessory gearboxes 9, 10, 11 shown in FIGS. 1 to 3, the generator 12, 36 is arranged in the radial direction between the bypass duct 2 and the engine core 5 in the area of the intermediate casing 15, where the generator 12, 36 may alternatively also be arranged for example in the radial direction outside the bypass duct 2 or in the area of the struts 17, 18.

In the exemplary embodiment shown in FIG. 1, the generator 36 is arranged on the drive shaft 13 of the accessory gearbox 9 extending in the radial direction relative to the engine shaft 14 in the area of the intermediate casing 15.

In both the embodiment shown in FIG. 2 and the embodiment shown in FIG. 3, the generator 12 is arranged in each case on the drive shaft 21 substantially extending in the axial direction, where the generator 12 is arranged, when viewed in the power flow from the engine shaft 14, in the exemplary embodiment shown in FIG. 2 in front of the accessory gearbox shafts and in the exemplary embodiment shown in FIG. 3 behind the accessory gearbox shafts. The arrangement of the generator 12 in the power flow in front of the accessory gearbox shafts has the advantage that since the generator 12 can be a major power consumer, the subsequent accessory gearbox shafts, through which no major power inputs have to be passed, can have small dimensions.

In FIG. 4, the generator 12, which is arranged on the drive shaft 21 of the accessory gearbox 10, is shown in more detail. The generator 12 has a rotor 23 and a stator 25, with the stator 25 being firmly connected to a casing 26 of the generator 12. The generator 12 is arranged in the axial direction of the drive shaft 21 in a recess of a casing 27 of said drive shaft 21 between the casing 27 of the drive shaft 21 and a casing 28 of the accessory gearbox 10, where the casing 26 of the generator 12 has a sealing surface 29 and 30 both in a contact area to the casing 27 of the drive shaft 21 and in a contact area to the casing 28 of the accessory gearbox 10, respectively.

In order to seal the stator 24, in this case arranged inside a dry area, and the rotor 23 likewise arranged in a dry area, from the adjacent casings 27 and 28 respectively, an oil separator 30 and 32 respectively is provided on both sides of the generator 12 in the area of the drive shaft 21.

For cooling of the stator 25 heating up during operation of the jet engine 1, the drive shaft 21 is in this case designed as a hollow shaft, where a cooling device 33 with an oil nozzle 35 is arranged in an end area 34 of the drive shaft 21, by means of which heat can be removed from the generator 12 by circulation of oil inside the hollow shaft 21.

To fix the generator 12 easily on the drive shaft 21 and to detach it from the latter, the stator 25 and the casing 26 of the generator 12 are split in the circumferential direction, and in this case designed in two parts or two shells respectively.

The precise design of the split in the generator 12 is not shown in greater detail in FIG. 4, but is substantially comparable to the generator 36 of alternative design shown in FIGS. 5 to 7 and described in the following as representative for the generator 12.

The generator 36 shown in greater detail in FIG. 5 is likewise provided with a rotor 37, a stator 38 and a casing 39, where the rotor 37 is non-rotatably fixed on the drive shaft 13 of the accessory gearbox 9 by a fixing device 40 shown in greater detail in FIG. 7 and in this case designed as a tongue and groove connection so that the rotor 37 is co-rotated by the drive shaft 13 during a rotary movement of the latter.

Unlike the generator 12, in the generator 36 a separator element 43 representing a casing device is arranged between a rotor area 41 receiving the rotor 37 and a stator area 42 receiving the stator 38, by which element the stator 38 together with the casing 39 of the generator 36 is encapsulated from the rotor 37. The separator element 43 is made from a non-magnetic material, so that the functioning of the generator 36 is not impaired by the separator element 43.

In the embodiment shown the separator element 43 is connected by fastening elements, not shown in more detail and for example designed as bolts, pins or the like, to a casing 44 of the drive shaft 13 adjacent to the casing 39 of the generator 36.

Since the separator element 43 does not represent a structural component, a thickness of the separator element 43 in the radial direction can be designed very small, depending on the selected material of the separator element 43, such that a gap between the rotor 37 and the stator 38 is very narrow and only minor losses are caused by the separator element 43.

The generator 36 has a cooling device not shown in greater detail which supplies a cooling medium, in particular oil to the rotor area 41 representing a wet area. The cooling medium removes thermal energy generated in the area of the stator 38 from the latter when the jet engine 1 is in operation. Since the coolant comes very close to the stator area 42 representing a dry area, the energy input by the coolant is very effective. In addition, corrosion of the rotor 37 is advantageously slowed down or prevented by the appropriately designed coolant.

To remove the generator 36 from the drive shaft 13 in a simple manner, for example for maintenance or repair work, the casing 39 of the generator 36 and the stator 38 in the circumferential direction are in this case designed as two parts or two shells, where the two parts 45, 46 have on the one hand a hinged connection designed as a hinge 47 and on the other hand a locking device 48. In the area of the locking device 48, both components 45, 46 of the generator 36 each have a flange by which the components 45, 46 of the generator 36 can, by fastening elements designed for example as screws, be fixed to one another or detached from one another, and the detachable components 45, 46 of the generator 36 can accordingly be fixed on the drive shaft 13 or detached therefrom.

The separator element 43 and if necessary the rotor 37, which unlike the stator 38 of the generator 36, for example, are not very prone to faults, are in this case not detachable from the drive shaft 13. In an alternative embodiment of the invention, they can also be split in the circumferential direction, and be integral parts of the two components 45, 46 of the generator 36 and hence detachable from the drive shaft 13.

Sealing elements can be provided in the area of the locking device 48 and the hinged connection.

To provide a firm link of the generator 36 to the drive shaft 13, alternatively or additionally to the sleeve-like hinged and locking device 47, 48, a fastening device 49 as shown in FIG. 6 and illustrated in simplified form can be provided in an area of the casing 39 of the generator 36 adjoining the casing 44 of the drive shaft 13 in the axial direction, with said fastening device 49 being designed in particular as a quick-action lock in the form of a so-called V-band clip. A fastening device 49 of this type can be provided in both axial rim areas of the generator 36 for fixing to the casing 44 of the drive shaft 13, with the casing 39 of the generator 36 being secured by the fastening device 49 also in the axial direction.

To prevent rotation of the casing 44 of the drive shaft 13 relative to the casing 39 of the generator 36 in particular during operation of the engine 1, a pin, a bolt or the like can for example be provided which can be arranged in flanges in the axial direction in the area of adjoining flanges of the casings 39, 44 in the area of the V-band clip 49.

With an alternative arrangement of the generator on a shaft, the fastening device can be provided for fixing the casing of the generator on a component adjacent to the casing of the generator in the respective application.

LIST OF REFERENCE NUMERALS

1 Jet engine
2 Bypass duct
3 Intake area
4 Fan
5 Engine core
6 Compressor device
7 Burner
8 Low-pressure turbine
8.1 High-pressure turbine
9, 10, 11 Accessory gearbox
12 Generator
13 Drive shaft
14 Engine shaft
15 Intermediate casing
16 Auxiliary unit
17 Inner strut
18 Outer strut
19 Gear pairing
20 Bevel gearing
21 Drive shaft
22 Bevel gearing
23 Rotor
24 Auxiliary shaft
25 Stator
26 Casing of generator
27 Casing of drive shaft
28 Casing of accessory gearbox
29, 30 Sealing surface
31, 32 Oil separator
33 Cooling device
34 End area of drive shaft
35 Oil nozzle
36 Generator
37 Rotor
38 Stator
39 Casing of generator
40 Fixing device
41 Rotor area
42 Stator area
43 Separator element
44 Casing of drive shaft
45, 46 Components of generator
47 Hinge
48 Locking device
49 Fastening device

What is claimed is:

1. An accessory gearbox arrangement for an engine, comprising:
   an accessory gearbox having an accessory gearbox shaft connectable to a first auxiliary unit;
   a drive shaft being operatively connectable to an engine shaft of the engine for driving the accessory gearbox and accessory gearbox shaft;
   the drive shaft, accessory gearbox and accessory gearbox shaft forming a power transmission path between the engine shaft and the first auxiliary unit;
   a second auxiliary unit arranged on the power transmission path intermediate the engine shaft and the first auxiliary unit such that power is transmitted from the engine shaft to the first auxiliary unit through the second auxiliary unit,
   wherein the second auxiliary unit is at least one chosen from a generator, a fuel pump, a hydraulic pump, a bleed unit and a starter;
   wherein the second auxiliary unit is arranged on at least one chosen from:
      the drive shaft; and
      an operative connection between the drive shaft and the engine shaft.

2. The accessory gearbox arrangement of claim 1, wherein the second auxiliary unit is a generator and is arranged at least partially in detachable manner on the at least one chosen from the drive shaft and the operative connection between the drive shaft and the engine shaft.

3. The accessory gearbox arrangement of claim 2, wherein the generator includes at least one stator and one casing which are arranged in a detachable manner on the at least one chosen from the drive shaft and the operative connection between the drive shaft and the engine shaft, and a rotor which is firmly connected to the at least one chosen from the drive shaft and the operative connection between the drive shaft and the engine shaft.

4. The accessory gearbox arrangement of claim 3, wherein the rotor is connectable to the at least one chosen from the drive shaft and the operative connection between the drive shaft and the engine shaft by a fixing device including a tongue and groove connection.

5. The accessory gearbox arrangement of claim 2, wherein the generator has a separate cooling system.

6. The accessory gearbox arrangement of claim 2, wherein a generator stator area having at least one stator is separated from a generator rotor area having at least one rotor.

7. The accessory gearbox arrangement of claim 6, and further comprising a separator element extending between the stator and the rotor for separation of the stator area from the rotor area.

8. The accessory gearbox arrangement of claim 7, wherein the separator element is made from a non-magnetic material.

9. The accessory gearbox arrangement of claim 7, wherein the separator element is integral with a casing of the generator.

10. The accessory gearbox arrangement of claim 7, wherein the separator element is a separate component connected via fastening elements to a casing of the generator.

11. The accessory gearbox arrangement of claim 3, wherein the second auxiliary unit is a generator, the generator including two components in a circumferential direction constructed and arranged to be detachable from around the at least one chosen from the drive shaft and the operative connection between the drive shaft and the engine shaft.

12. The accessory gearbox arrangement of claim 11, and further comprising a hinged connection swivellably connecting first sides of the two components and a locking device connecting second sides of the two components.

13. The accessory gearbox arrangement of claim 11, and further comprising a fastening device circumferentially gripping around the generator to fasten the two components on the at least one chosen from the drive shaft and the operative connection between the drive shaft and the engine shaft.

14. The accessory gearbox arrangement of claim 13, wherein the fastening device interacts with an axially lateral area of a generator casing and with an area of an adjacent casing adjoining the area of the generator casing.

15. The accessory gearbox arrangement of claim 1, wherein, the second auxiliary unit is a generator, and the at least one chosen from the drive shaft and the operative connection between the drive shaft and the engine shaft includes a hollow portion and a cooling device is provided with a coolant which can be passed through the hollow portions for cooling of the generator.

* * * * *